Sept. 30, 1952  A. R. HAGEN  2,611,987
FISH LURE
Filed July 2, 1947
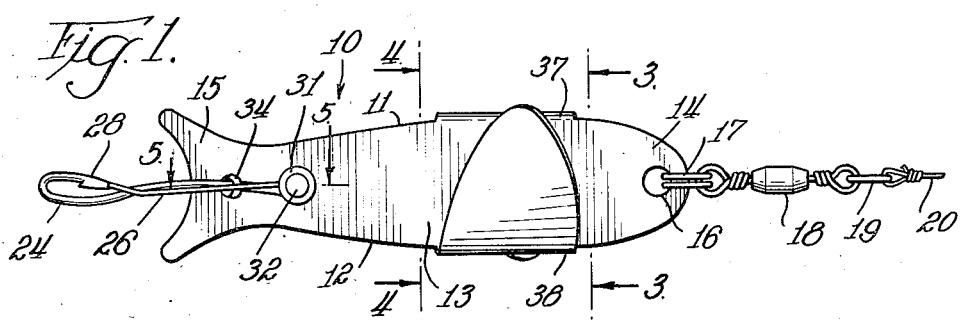
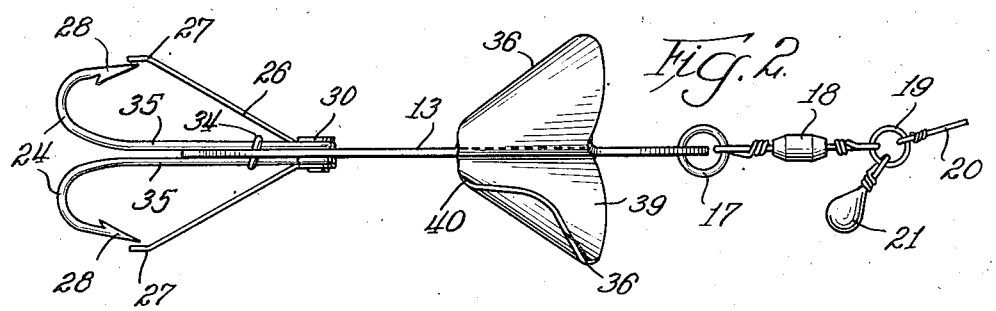
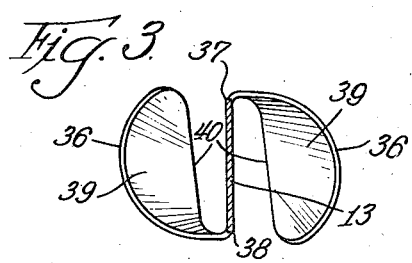
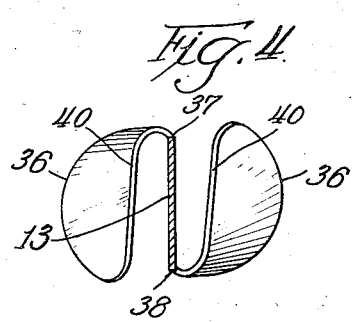
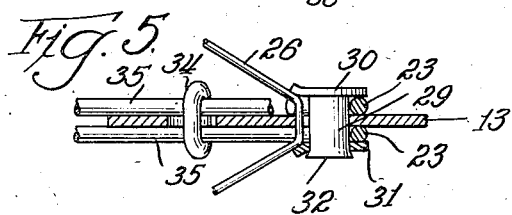
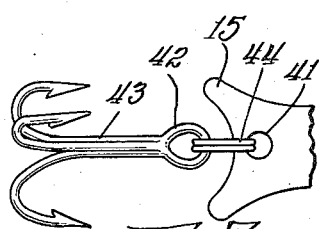
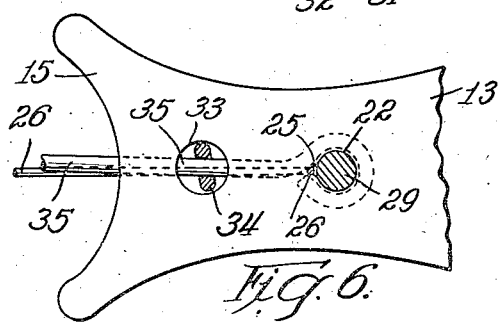
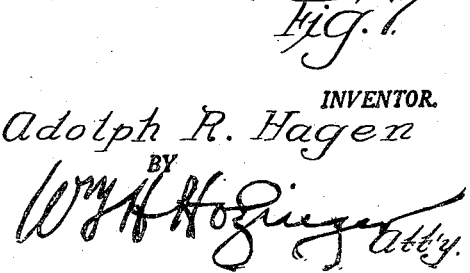
INVENTOR.
Adolph R. Hagen
BY
Wm H Hozinger
Atty.

Patented Sept. 30, 1952

2,611,987

UNITED STATES PATENT OFFICE 2,611,987

FISH LURE

Adolph R. Hagen, Chicago, Ill.

Application July 2, 1947, Serial No. 758,569

2 Claims. (Cl. 43—42.51)

This invention pertains to new and useful improvements in fish lures. The device of the invention is equally adapted for use in either casting or trolling and may be made in sizes from that for use with the lightest of equipment, as, for instance, a fly rod, up to and including sizes for use in deep sea trolling, wherein the heaviest of equipment is used.

While it is a matter of considerable divergence of opinion among fishermen as to whether it is hunger, curiosity or anger which causes fish to strike artificial lures, it is generally conceded to be a fact that good results are uniformly had with lures which provide considerable action and particularly when the action is coupled with ability of the lures to reflect and flash light from their surfaces.

Lures provided with spinners, or in fact, lures similar to that comprising the invention in that the body of the lure spins as it is retrieved or trolled through the water have met with considerable favor by reason of their fish-catching ability. One factor which has been noted with respect to heretofore known lures, the body of which spins, is that they must be retrieved after a cast or trolled at considerable speed to continuously maintain their spinning action. Additionally, lures of this type of which I am aware do not present as much flash during rotation as is desirable, particularly when light conditions are poor as on a cloudy day or at sun-up or sunset.

In view of the foregoing, it is one important object of my invention to provide a lure which will invariably spin even when retrieved or trolled at extremely low speed.

A still further object of my invention is to provide a lure which is highly light reflective, being fast-flashing and also reflecting the light rays throughout a wide band making it alluring to fish at points quite remote from the lure.

Yet another object of the invention is to provide a lure so formed and balanced that the hook arrangement of which is borne so as invariably to be in line with the retrieve or troll, this being commonly the direction from which the fish strikes, and in consequence of which the ratio of fish actually hooked to the number of strikes had is considerably enhanced.

Among still other objects and advantages provided by the lure may be mentioned its sturdy, unitary construction, its non-resisting action when being cast, retrieved or trolled and its freedom from tendency to cause line twisting.

How the above and still additional objects and advantages of the lure are accomplished will be apparent from the detailed description which follows and from the drawings in which:

Fig. 1 is a plan view of one form of my invention;

Fig. 2 is a side elevational view of the showing of Fig. 1;

Fig. 3 is a fragmentary cross sectional view of the invention taken substantially along the line 3—3 of Fig. 1 and looking in the direction indicated by the arrows;

Fig. 4 is a fragmentary cross-sectional view taken substantially along the line 4—4 of Fig. 1 looking in the direction indicated;

Fig. 5 is a fragmentary cross sectional view taken substantially on the line 5—5 of Fig. 1;

Fig. 6 is a fragmentary view of the rearward part of the body portion; and

Fig. 7 is a fragmentary side elevation of the rearward end of the body portion as it appears when associated with a conventional treble hook.

Referring now to the drawings, reference numeral 10 indicates generally the lure which has curvilinear upper and lower side edges 11, 12, respectively, giving it a fish-like appearance in side elevation. Curvilinear edges 11, 12 tend to define what appears in side view to simulate a fish body 13, its head 14 and its tail 15.

As best seen in Fig. 2, lure body portion 13 generally comprises a thin, elongated unitary planar piece of metal, plastic material or the like, its only divergence from overall planarity being the hereinafter described convolute fins or flutes which, in the preferred form of the device, represent integral continuations of the body material extending from opposite side edges thereof.

The fish-head-simulating fore-end 14 of the lure is provided with an opening 16 to receive a split-ring 17 to which is attached one end of a conventional swivel 18. Attached to the fore end of swivel 18 is a ring 19 to which is attached the usual line or leader 20. As shown in Fig. 2, a weight or sinker 21 is attached to ring 19 or, if desired, to the fore-end of swivel 18, the presence of which forwardly of the lure tends to prevent twisting of line 20 due to sometimes-occurring failure of swivel 18 to permit rotation of the lure without transmitting such rotation to the line, causing the line to kink.

Aft of lure body portion 13 and adjacent tail portion 15 is a transverse opening 22 aligned with which, on opposite sides of body portion 13, are the eyes 23, 23 of rearwardly extending barbed hooks 24, 24. As shown in Figs. 5 and 6, opening 22 is notched out in the direction of tail 15 as at 25 to receive the medial portion of a generally V-shaped spring wire 26 the ends 27, 27 of which extend rearwardly to terminate slightly rearwardly of hook points 28, 28 to thereby render hooks 24, 24 substantially weedless. A rivet 29 having an integral head 30 extends through hook eyes 23, 23 and opening 22, and an annular washer 31 is held on the end thereof by the rivet end enlargement 32. This last described construction firmly affixes the hooks and the weed diverting wire 26 to the lure body.

Still referring to Figs. 5 and 6, it will be noted that an opening 33 is provided in tail portion 15 rearwardly of rivet 29, through which extends a link 34 which encompasses the shanks 35, 35 of hooks 24, 24 giving such hooks medial support and inhibiting them from swinging on rivet 29.

To impart rotation to the lure, body portion 13 is provided with integral convolute fins or flutes 36, 36 which are integrally joined to body portion 13 at opposite sides of the latter as at 37, 38. As best shown in Figs. 2, 3 and 4, flutes or fins 36, 36 are so shaped as to present toward the direction of pull of the lure open mouthed water-impinging inner surfaces 39, 39 which taper arcuately and inwardly in a rearward direction and in a convolute manner to terminate in free edges 40, 40 almost parallel with the plane of body portion 13 leaving a narrow water outlet opening between each free edge 40 and the lure body portion. It will be obvious that the funnel-like forwardly convolutely directed position of the fins or flutes 36, 36 will scoop up a considerable amount of water during forward pull of the lure. This scooped-up water in seeking an outlet becomes to a degree agitated and compressed by the tapered form of the fins, setting up frictional forces against convolute surfaces 39, 39 which impart rapid rotation to the lure.

It is to be noted (Fig. 1) that hooks 24, 24 are so positioned that their points or barbs 28, 28 are directed in the direction of rotation of the lure, a matter of considerable importance when it is considered that the hooks spin with the lure. This construction considerably enhances the hooking ability of the lure when struck by a fish.

Referring now to Fig. 7, therein is illustrated the appearance of the lure when the hook arrangement otherwise shown on the drawings is dispensed with and a conventional treble hook is substituted therefor. In this instance lure tail portion 15 is provided with an opening 41 to receive the split ring 44 which is threaded through the eye 42 of the treble hook 43. Experience has shown that when the hook 43 is of a size having a cross dimension smaller than the cross dimension of the lure across the widest portion of its fins or flutes, the lure is considerably less apt to snag weeds and obstructions than lures the hooks of which are not so protected. This is due to the fact that under normal conditions of retrieve or troll the lure is spinning so rapidly as to cause the treble hook to centrifugally align itself with the body portion and when the fins strike an obstruction the entire lure is often sufficiently deflected to prevent snagging of the trailing hook.

It will be obvious from the foregoing description that by my construction I have provided a lure which achieves all the highly desirable objects set forth with respect to it. Having illustrated and described my invention in considerable detail, I do not wish to be limited to the exact forms shown, which are merely illustrative, desiring to be limited only by the scope of the appended claims.

I claim:

1. In a fish lure a body portion generally planar throughout, said body having a convolute fin extending from each opposite edge thereof and each fin arcuately extending at a distance therefrom across the full width and a portion of the length of each side of said body portion, said fins being wider at one end than at the other and having the wider ends of their convolutions faced toward the fore-end of said lure and convolutely tapering to form between each of said fins and said body portion water outlet spaces at the rearward part of said fins of substantially restricted cross dimension in contrast to the cross dimension of the large ends of the convolutions of said fins.

2. A fish lure comprising a planar body portion shaped in side view to simulate a fish and rearwardly of the head-simulating portion having at each lateral edge a fin integral with said body portion and diametrically opposed to another fin identical to said first-mentioned fin, said fins being bent arcuately and convolutely and being of sufficient length to extend across the full width of said body portion in closely spaced relation thereto to form funnel-like water passageways immediate each side of said body portion with the large openings of each water passageway extending forwardly in the direction in which the lure is pulled during use.

ADOLPH R. HAGEN.

REFERENCES CITED

The following references are of record in the file of this patent:

UNITED STATES PATENTS

| Number | Name | Date |
|---|---|---|
| 146,764 | James | Jan. 27, 1874 |
| 760,028 | Shulean | May 17, 1904 |
| 1,804,391 | Abrahams | May 12, 1931 |
| 1,888,641 | Toepper | Nov. 22, 1932 |
| 1,992,766 | Pflueger | Feb. 26, 1935 |
| 2,003,550 | Muller | June 4, 1935 |
| 2,086,008 | Turner | July 6, 1937 |
| 2,121,474 | Bowering | June 21, 1938 |
| 2,256,346 | Mathie | Sept. 16, 1941 |